(12) United States Patent
Kono et al.

(10) Patent No.: US 9,419,461 B2
(45) Date of Patent: Aug. 16, 2016

(54) CHARGE AND DISCHARGE CONTROL DEVICE, CHARGE CONTROL METHOD, DISCHARGE CONTROL METHOD, AND PROGRAM

(71) Applicant: MITSUBISHI HEAVY INDUSTRIES, LTD., Tokyo (JP)

(72) Inventors: Takayuki Kono, Tokyo (JP); Katsuaki Morita, Tokyo (JP); Kazuki Ozaki, Tokyo (JP)

(73) Assignee: MITSUBISHI HEAVY INDUSTRUIES, LTD., Tokyo (JP)

( * ) Notice: Subject to any disclaimer, the term of this patent is extended or adjusted under 35 U.S.C. 154(b) by 157 days.

(21) Appl. No.: 14/360,699

(22) PCT Filed: Nov. 13, 2012

(86) PCT No.: PCT/JP2012/079364
§ 371 (c)(1),
(2) Date: May 27, 2014

(87) PCT Pub. No.: WO2013/084673
PCT Pub. Date: Jun. 13, 2013

(65) Prior Publication Data
US 2015/0180242 A1    Jun. 25, 2015

(30) Foreign Application Priority Data
Dec. 9, 2011   (JP) .................................. 2011-269937

(51) Int. Cl.
| | | |
|---|---|---|
| H02J 7/00 | (2006.01) | |
| B60L 7/14 | (2006.01) | |
| G01N 27/416 | (2006.01) | |
| G08B 21/00 | (2006.01) | |
| B60L 11/18 | (2006.01) | |
| H01M 10/46 | (2006.01) | |
| H02J 7/14 | (2006.01) | |
| H01M 10/44 | (2006.01) | |

(52) U.S. Cl.
CPC . *H02J 7/007* (2013.01); *B60L 7/14* (2013.01); *B60L 11/1803* (2013.01); *B60L 11/1862* (2013.01); *H01M 10/46* (2013.01); *H02J 7/0068* (2013.01); *H02J 7/1469* (2013.01); *B60L 2210/10* (2013.01); *H01M 10/44* (2013.01); *H01M 2220/20* (2013.01); *H02J 2007/0067* (2013.01); *Y02T 10/705* (2013.01); *Y02T 10/7005* (2013.01); *Y02T 10/7044* (2013.01); *Y02T 10/7216* (2013.01)

(58) Field of Classification Search
CPC ............... H02J 7/00; H02J 7/04; H02J 7/007; H02J 7/0068; H02J 7/1469; H02J 2007/0067; B60L 7/14; B60L 11/1803; B60L 11/1862; B60L 2210/10; H01M 10/46; H01M 10/44; H01M 2220/20; Y02T 10/7005; Y02T 10/7044; Y02T 10/705; Y02T 10/7216; G01N 27/416; G08B 21/00
USPC ................. 320/101, 134, 135, 136, 143, 160; 324/433; 340/636.12, 636.17, 636.19
See application file for complete search history.

(56) References Cited

U.S. PATENT DOCUMENTS

| | | | | |
|---|---|---|---|---|
| 5,264,764 A | * | 11/1993 | Kuang ..................... | B60K 6/46 180/65.245 |
| 5,592,095 A | * | 1/1997 | Meadows ............... | H02J 7/0004 320/149 |
| 5,804,947 A | * | 9/1998 | Nii .......................... | B60K 6/46 318/153 |
| 2002/0062183 A1 | * | 5/2002 | Yamaguchi .............. | B60K 6/46 701/22 |
| 2002/0113441 A1 | * | 8/2002 | Obayashi .................. | H02J 1/14 290/40 C |
| 2006/0061330 A1 | * | 3/2006 | Sato ....................... | H01M 10/44 320/125 |
| 2012/0091811 A1 | * | 4/2012 | Heidenreich ........... | H02J 9/062 307/65 |

FOREIGN PATENT DOCUMENTS

| | | |
|---|---|---|
| CN | 1792665 | 6/2006 |
| JP | 2000-341861 | 12/2000 |
| JP | 2002-204505 | 7/2002 |
| JP | 2006-054958 | 2/2006 |
| JP | 2007-83989 | 4/2007 |
| JP | 2009-273198 | 11/2009 |
| WO | 2011/007695 | 1/2011 |
| WO | 2011/135631 | 11/2011 |

OTHER PUBLICATIONS

Kauaki et al., Machine English Translation of Japanese Patent Publication Document No. 2007-083989, Published Apr. 5, 2007, Machine Translated by JPO tranlsation tool on Dec. 14, 2015.*
Kauma, Machine English Translation of Japanese Patent Application Publication No. 2002=204505, Published Jul. 19, 2002, Machine Translated by JPO translation tool on Dec. 14, 2015.*
International Search Report issued Dec. 18, 2012 in International (PCT) Application No. PCT/JP2012/079364 with English translation.
Japanese Office Action issued May 20, 2014 in corresponding Japanese Patent Application No. 2011-269937 with English translation.
Written Opinion of the International Searching Authority issued Dec. 18, 2012 in International (PCT) Application No. PCT/JP2012/079364 with English translation.
Chinese Office Action issued Oct. 10, 2015 in corresponding Chinese Patent Application No. 201280056942.0 with partial English translation.

* cited by examiner

*Primary Examiner* — Phallaka Kik
(74) *Attorney, Agent, or Firm* — Wenderoth, Lind & Ponack, L.L.P.

(57) ABSTRACT

When power required by a load is larger than or equal to reception peak-cut power, a secondary battery discharges at a power rate that is larger or equal to a difference between the required power and the reception peak-cut power, and when the required power is smaller than or equal to the reception peak-cut power, the secondary battery discharges at a power rate that is smaller than or equal to the discharge improving power value. When power generated by the load is larger than or equal to transmission peak-cut power, the secondary battery charges at a power rate that is larger or equal to a difference between the regenerative power and the transmission peak-cut power, and when the regenerative power is smaller than or equal to the transmission peak-cut power, the secondary battery charges at a power rate that is smaller than or equal to the charge improving power value.

14 Claims, 7 Drawing Sheets

CHARGE AND DISCHARGE CONTROL DEVICE, CHARGE CONTROL METHOD, DISCHARGE CONTROL METHOD, AND PROGRAM

TECHNICAL FIELD

The present invention relates to a charge and discharge control device, a charge control method, a discharge control method, and a program for controlling charge and discharge of a secondary battery to be coupled to a load capable of generating the regenerative power.

Priority is claimed on Japanese Patent Application No. 2011-269937, filed Dec. 9, 2011, the content of which is incorporated herein by reference.

BACKGROUND ART

Conventionally, vehicles running with the power supplied from wires are known. The power required for such a vehicle to run (running power) differs depending on environments, such as slopes of rails on which the vehicle runs. For this reason, the capacity and power consumption of a substation supplying the power to wires are determined based on a variation of the voltage caused by the running power.

Additionally, when such a vehicle brakes and thereby causes the regenerative power to be generated, the regenerative power is fed to the wires to prevent a regenerative failure. The regenerative power fed to the wires is collected by the substation. For this reason, an interval at which substations are to be installed is determined based on a variation of the voltage caused by the regenerative power.

In order to reduce costs for a traffic system by decreasing the number of substations to be installed, suppression of the peaks of the running power and the regenerative power (peak cut) has been considered. As a method of cutting the peaks of the running power and the regenerative power, there is a method in which a secondary battery is mounted on a vehicle to absorb the regenerative power and supplement the running power.

In order to adequately cut the peak of the power, it is necessary to adequately manage a charging rate of the secondary battery.

Patent Document 1 discloses a method of performing a charge so that a charging rate varies within an adequate range of the charging rate, thereby preventing a secondary battery mounted on a wire-less vehicle from deteriorating.

Patent Document 2 discloses a method of controlling a charging rate of a secondary battery mounted on a wire-less vehicle.

CITATION LIST

Patent Document

[Patent Document 1] Japanese Patent Laid-Open Publication No. 2006-054958
[Patent Document 2] Japanese Patent Laid-Open Publication No. 2009-273198

DISCLOSURE OF THE INVENTION

Problems to be Solved by the Invention

However, the methods disclosed by Patent Documents 1 and 2 are used to adjust the charging rate of the secondary battery in order to enable the vehicle to run in wire-less intervals. Both documents fail to disclose a method of adjusting the charging rate of the secondary battery while performing a peak cutting process.

An object of the present invention is to provide a charge and discharge control device, a charge control method, a discharge control method, and a program for adjusting a charging rate of a secondary battery while performing a peak cutting process.

Means for Solving the Problems

The present invention has been made to solve the above problem. The present invention is a charge and discharge control device configured to control charge and discharge of a secondary battery coupled to a load capable of generating a regenerative power. The charge and discharge control device includes a peak cutting unit configured to, in a case that a required power required by the load is larger than or equal to a reception peak-cut power set as a power receivable from a wire, have the secondary battery discharged at a power rate that is larger or equal to a difference between the required power and the reception peak-cut power; an improving power value calculating unit configured to calculate a discharge improving power value defined as a power value that increases as a charging rate of the secondary battery becomes larger than a target charging rate; and a charging rate improving unit configured to, in a case that the required power is smaller than or equal to the reception peak-cut power, have the secondary battery discharged at a power rate that is smaller than or equal to the discharge improving power value calculated by the improving power value calculating unit.

Additionally, regarding the present invention, the peak cutting unit is preferably configured to have the secondary battery discharged at a power rate equal to the discharge improving power value, in a case that the required power is larger than or equal to the reception peak-cut power, and the discharge improving power value is larger than or equal to a value of a difference between the required power and the reception peak-cut power.

Further, regarding the present invention, the peak cutting unit is preferably configured to have the secondary battery discharged at a power rate that is smaller than a maximum discharge power value for discharge allowed by the secondary battery.

Moreover, regarding the present invention, the charge and discharge control device preferably further includes a discharge terminating unit configured to terminate discharge by the peak cutting unit in a case that the charging rate of the secondary battery is smaller than a minimum charging rate allowed to the secondary battery.

Additionally, regarding the present invention, the peak cutting unit is preferably configured to, in a case that a regenerative power generated by the load is larger than or equal to a transmission peak-cut power set as a power transmittable to a wire, have the secondary battery charged at a power rate that is larger than or equal to a difference between the regenerative power and the transmission peak-cut power. The improving power value calculating unit is preferably configured to calculate a charge improving power value defined as a power value that increases as the charging rate of the secondary battery becomes lower than the target charging rate of the secondary battery. The charging rate improving unit is preferably configured to, in a case that the regenerative power is smaller than or transmission peak-cut power, have the secondary battery charged at a power rate that is smaller than or equal to the charge improving power value calculated by the improving power value calculating unit.

Further, regarding the present invention, the peak cutting unit is preferably configured to have the secondary battery charged at a power rate equal to the charge improving power value, in a case that the regenerative power is larger than or equal to the transmission peak-cut power, and the charge improving power value is larger than or equal to a difference between the regenerative power and the transmission peak-cut power.

Moreover, regarding the present invention, the peak cutting unit is preferably configured to have the secondary battery charged at a power rate that is smaller than a maximum charge power value for charge allowed by the secondary battery.

Additionally, regarding the present invention, the charge and discharge control device preferably further includes a charge terminating unit configured to terminate charge by the peak cutting unit in a case that the charging rate of the secondary battery exceeds a maximum charging rate allowed to the secondary battery.

Further, the present invention is a charge and discharge control device configured to control charge and discharge of a secondary battery coupled to a load capable of generating a regenerative power. The charge and discharge control device includes: a peak cutting unit configured to, in a case that a regenerative power generated by the load is larger than or equal to a transmission peak-cut power set as a power transmittable to a wire, have the secondary battery charged at a power rate that is larger or equal to a difference between the regenerative power and the transmission peak-cut power; an improving power value calculating unit configured to calculate a charge improving power value defined as a power value that increases as a charging rate of the secondary battery becomes smaller than a target charging rate; and a charging rate improving unit configured to, in a case that the regenerative power is smaller than or equal to the transmission peak-cut power, have the secondary battery charged at a power rate that is smaller than or equal to the charge improving power value calculated by the improving power value calculating unit.

Moreover, regarding the present invention, the peak cutting unit is preferably configured to have the secondary battery charged at a power rate equal to the charge improving power value, in a case that the regenerative power is larger than or equal to the transmission peak-cut power, and the charge improving power value is larger than or equal to a value of a difference between the regenerative power and the transmission peak-cut power.

Additionally, the present invention is a charge and discharge control method using a charge and discharge control device configured to control charge and discharge of a secondary battery coupled to a load capable of generating a regenerative power. The charge and discharge control method includes: in a case that a required power required by the load is larger than or equal to a reception peak-cut power set as a power receivable from a wire, a peak cutting unit having the secondary battery discharged at a power rate that is larger or equal to a difference between the required power and the reception peak-cut power; an improving power value calculating unit calculating a discharge improving power value defined as a power value that increases as a charging rate of the secondary battery becomes larger than a target charging rate; and in a case that the required power is smaller than or equal to the reception peak-cut power, a charging rate improving unit having the secondary battery discharged at a power rate that is smaller than or equal to the discharge improving power value calculated by the improving power value calculating unit.

Further, the present invention is a charge and discharge control method using a charge and discharge control device configured to control charge and discharge of a secondary battery coupled to a load capable of generating a regenerative power. The charge and discharge control device includes: in a case that a regenerative power generated by the load is larger than or equal to a transmission peak-cut power set as a power transmittable to a wire, a peak cutting unit having the secondary battery charged at a power rate that is larger or equal to a difference between the regenerative power and the transmission peak-cut power; an improving power value calculating unit calculating a charge improving power value defined as a power value that increases as a charging rate of the secondary battery becomes smaller than a target charging rate; and in a case that the regenerative power is smaller than or equal to the transmission peak-cut power, a charging rate improving unit having the secondary battery charged at a power rate that is smaller than or equal to the charge improving power value calculated by the improving power value calculating unit.

Moreover, the present invention is a program to cause a charge and discharge control device configured to control charge and discharge of a secondary battery coupled to a load capable of generating a regenerative power, to function as: a peak cutting unit configured to, in a case that a required power required by the load is larger than or equal to a reception peak-cut power set as a power receivable from a wire, have the secondary battery discharged at a power rate that is larger or equal to a difference between the required power and the reception peak-cut power; an improving power value calculating unit configured to calculate a discharge improving power value defined as a power value that increases as a charging rate of the secondary battery becomes larger than a target charging rate; and a charging rate improving unit configured to, in a case that the required power is smaller than or equal to the reception peak-cut power, have the secondary battery discharged at a power rate that is smaller than or equal to the discharge improving power value calculated by the improving power value calculating unit.

Additionally, the present invention is a program to cause a charge and discharge control device configured to control charge and discharge of a secondary battery coupled to a load capable of generating a regenerative power, to function as: a peak cutting unit configured to, in a case that a regenerative power generated by the load is larger than or equal to a transmission peak-cut power set as a power transmittable to a wire, have the secondary battery charged at a power rate that is larger or equal to a difference between the regenerative power and the transmission peak-cut power; an improving power value calculating unit configured to calculate a charge improving power value defined as a power value that increases as a charging rate of the secondary battery becomes smaller than a target charging rate; and a charging rate improving unit configured to, in a case that the regenerative power is smaller than or equal to the transmission peak-cut power, have the secondary battery charged at a power rate that is smaller than or equal to the charge improving power value calculated by the improving power value calculating unit.

Effects of the Invention

According to the present invention, a peak cutting process is performed using a secondary battery when the required power or the regenerative power is larger than or equal to the peak cut power. When the required power or the regenerative power is smaller than the peak cut power, the charging rate of the secondary battery is improved. Thus, it is possible to adjust the charging rate of the secondary battery while performing a peak cut process.

BEST MODE FOR CARRYING OUT THE INVENTION

Hereinafter, embodiments of the present invention will be described in detail with reference to drawings.

First Embodiment

Figure 1:
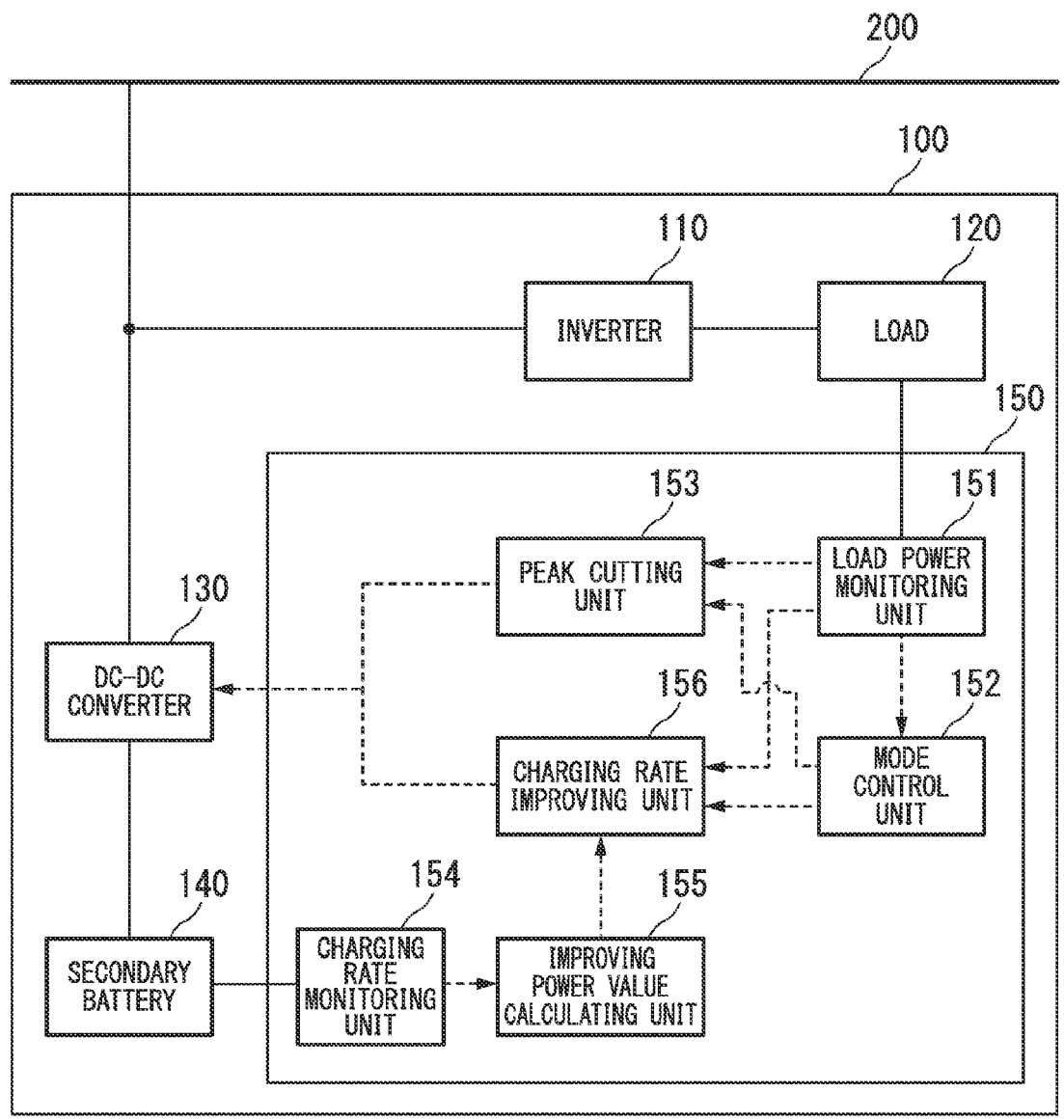
FIG. 1 is a schematic block diagram illustrating a configuration of a vehicle including a charge and discharge control device according to a first embodiment of the present invention.

FIG. 1 is a schematic block diagram illustrating a configuration of a vehicle 100 including a charge and discharge control device 150 according to a first embodiment of the present invention.

The vehicle 100 of the present embodiment includes an inverter 110, a load 120, a DC-DC converter 130, a secondary battery 140, and a charge and discharge control device 150.

The inverter 110 converts into the alternate-current power, the direct-current power supplied from a wire 200 and the direct-current power supplied from the secondary battery 140 via the DC-DC converter 130.

The load 120 has the vehicle 100 run using the alternate-current power converted by the inverter 110. Additionally, the load 120 has the vehicle 100 perform regenerative braking, thereby causing the regenerative power to be generated. The regenerative power is fed to the wire 200 and the secondary battery 140 via the inverter 110.

The DC-DC converter 130 converts the voltage of the power supplied from the wire 200 and the load 120 and the voltage of the power supplied from the secondary battery 140.

The secondary battery 140 is coupled to the wire 200 and the load 120 via the DC-DC converter 130. The secondary battery 140 is charged using the power supplied from the wire 200 and the load 120. Additionally, the secondary battery 140 supplies the power to the load 120 via the DC-DC converter 130.

The charge and discharge control device 150 is a device that controls charge and discharge of the secondary battery 140. The charge and discharge control device 150 includes a load power monitoring unit 151, a mode control unit 152, a peak cutting unit 153, a charging rate monitoring unit 154, an improving power value calculating unit 155, and a charging rate improving unit 156.

The load power monitoring unit 151 monitors the required power required for the load 120 to have the vehicle run, and a value of the regenerative power generated by the load 120. Hereinafter, the required power and the regenerative power are collectively referred to as the "load power".

The mode control unit 152 changes, based on the load power, a control mode that controls charge and discharge of the secondary battery 140 to one of a wire preferred mode or a battery preferred mode. The wire preferred mode is a mode that prefers to use a power supply from the wire 200. The battery preferred mode is a mode that prefers to improve charging rate of the secondary battery 140.

The peak cutting unit 153, when the control mode is set to the wire preferred mode, outputs to the DC-DC converter 130, an instruction to control the amount of power by which the secondary battery 140 is charged or discharged, so that the power received from or fed to the wire 200 does not exceed a predetermined peak-cut power. Specifically, when the vehicle 100 is running, the peak cutting unit 153 outputs a discharge instruction to have the secondary battery 140 discharged at a power rate equal to a value of a difference between the required power and the reception peak-cut power that is the maximum value of the power receivable from the wire 200. On the other hand, when the vehicle 100 is braking, the peak cutting unit 153 outputs a charge instruction to have the secondary battery 140 charged at a power rate equal to a value of a difference between the regenerative power and the transmission peak-cut power that is the maximum value of the power transmittable to the wire 200.

The charging rate monitoring unit 154 monitors a charging rate of the secondary battery 140. The monitoring of the secondary battery 140 can be performed by measuring the open circuit voltage of the secondary voltage 140 and specifying the charging rate associated with the open circuit voltage.

The improving power value calculating unit 155 calculates an improving power value representing a power value required to have the charging rate of the secondary battery 140 reach a predetermined target charging rate. Here, calculation of the improving power value is performed by PI control. Here, as a difference between the charging rate of the secondary battery 140 and the target charging rate becomes larger, the improving power value becomes larger. Specifically, when the charging rate of the secondary battery 140 is larger than the target charging rate, the improving power value used to discharge the secondary battery 140 (discharge improving power value) increases as the difference between the charging rate of the secondary battery 140 and the target charging rate increases. On the other hand, when the charging rate of the secondary battery 140 is smaller than the target charging rate, the improving power value used to charge the secondary battery 140 (charge improving power value) increases as the difference between the charging rate of the secondary battery 140 and the target charging rate increases.

The charging rate improving unit 156, when the control mode is set to the battery preferred mode, outputs to the DC-DC converter 130, an instruction to control the power rate at which the secondary battery 140 is charged or discharged, based on the improving power value.

Next, processing of the charge and discharge control device 150 according to the present embodiment is described.

Figure 2:
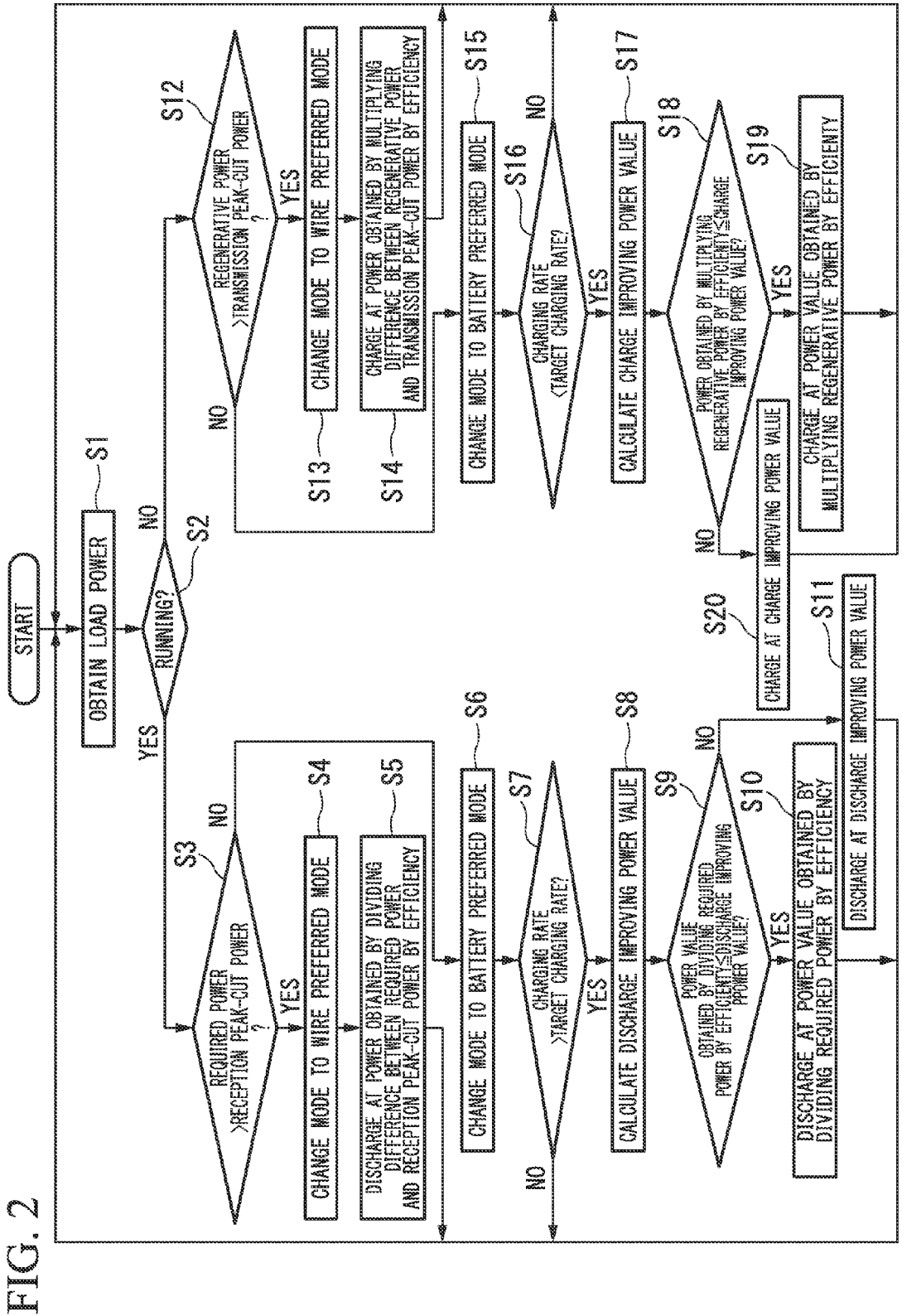
FIG. 2 is a flowchart illustrating processing of a charge and discharge control device according to the first embodiment of the present invention.

FIG. 2 is a flowchart illustrating the processing of the charge and discharge control device 150 according to the first embodiment of the present invention.

When a train initiates running, the load power monitoring unit 151 obtains the load power (step S1). Then, the load power monitoring unit 151 determines whether the load 120 is under a running operation or a braking operation (step S2).

If the load power monitoring unit 151 determines that the load 120 is under the running operation (step S2: YES), the mode control unit 152 determines whether or not the required power is larger than the preset reception peak-cut power (step S3). If the mode control unit 152 determines that the required power is larger than the preset reception peak-cut power (step S3: YES), the mode control unit 152 changes the control mode to the wire preferred mode (step S4). Here, if the control mode is already set to the wire preferred mode, there is no need to change the control mode.

If the control mode of the mode control unit 152 is set to the wire preferred mode, the peak cutting unit 153 outputs to the DC-DC converter 130, a discharge instruction to discharge the secondary battery 140 at a power rate obtained by dividing a value of the difference between the required power and the reception peak-cut power by the efficiency of the DC-DC converter 130 (step S5). Then, the processing returns to step S1, and the charge and discharge control device 150 performs charge and discharge control at the next time.

On the other hand, if the mode control unit 152 determines that the required power is smaller than or equal to the preset reception peak-cut power (step S3: NO), the mode control unit 152 changes the control mode to the battery preferred mode (step S6). Here, if the control mode is already set to the battery preferred mode, there is no need to change the control mode.

When the control mode of the mode control unit 152 is set to the battery preferred mode, the charging rate monitoring unit 154 obtains the charging rate of the secondary battery 140. Then, the improving power value calculating unit 155 determines whether or not the charging rate of the secondary battery 140 is larger than the preset target charging rate (step S7). If the charging rate of the secondary battery 140 is smaller than or equal to the target charging rate (step S7: NO), discharge of the secondary battery 140 is not performed and the processing returns to step S1, since the difference between the charging rate of the secondary battery 140 and the target charging rate becomes larger if the secondary battery 140 is discharged.

On the other hand, if the charging rate of the secondary battery 140 is larger than the target charging rate (step S7: YES), the improving power value calculating unit 155 calculates, by PI control, a discharge improving power value based on the charging rate of the secondary battery 140 and the target charging rate (step S8). Then, the charging rate improving unit 156 determines whether or not the power value obtained by dividing the required power by the efficiency of the DC-DC converter 130 is smaller than or equal to the discharge improving power value (step S9).

If the charging rate improving unit 156 determines that the power value obtained by dividing the required power by the efficiency of the DC-DC converter 130 is smaller than or equal to the discharge improving power value (step S9: YES), the charging rate improving unit 156 outputs to the DC-DC converter 130, a discharge instruction to have the secondary battery 140 discharged at a power rate obtained by dividing the required power by the efficient (step S10). Thus, the power required by the load 120 is supplied from the secondary battery 140. Consequently, the charging rate of the secondary battery 140 becomes closer to the target charging rate. Then, the processing returns to step S1, and the charge and discharge control device 150 performs charge and discharge control at the next time.

On the other hand, if the charging rate improving unit 156 determines that the power value obtained by dividing the required power by the efficiency of the DC-DC converter 130 is larger than the discharge improving power value (step S9: NO), the charging rate improving unit 156 outputs to the DC-DC converter 130, a discharge instruction to have the secondary battery 140 discharged at a power rate equal to the discharge improving power value (step S11). Thus, the charging rate of the secondary battery 140 becomes closer to the target charging rate. At this time, similar to step S10, if control is made to supply all the power required by the load 120 from the secondary battery 140, the charging rate of the secondary battery 140 might be below the target charging rate. For this reason, the secondary battery 140 is discharged at a power rate equal to the discharge improving power value, and the rest of the required power is supplied from the wire 200, thereby making it possible to adequately control charge and discharge so that the charging rate of the secondary battery 140 becomes closer to the target charging rate.

Then, the processing returns to step S1, and the charge and discharge control device 150 performs charge and discharge control at the next time.

In step S2, if the load power monitoring unit 151 determines that the load 120 is under the regenerative breaking operation (step S2: NO), the mode control unit 152 determines whether or not the regenerative power is larger than the preset transmission peak-cut power (step S12). If the mode control unit 152 determines that the regenerative power is larger than the transmission peak-cut power (step S12: YES), the mode control unit 152 changes the control mode to the wire preferred mode (step S13). Here, if the control mode is already set to the wire preferred mode, there is no need to change the control mode.

When the control mode of the mode control unit 152 is set to the wire preferred mode, the peak cutting unit 153 outputs to the DC-DC converter 130, a charge instruction to have the secondary battery 140 charged at a power rate obtained by multiplying a value of a difference between the regenerative power and the transmission peak-cut power by the efficiency of the DC-DC converter 130 (step S14). Then, the processing returns to step S1, and the charge and discharge control device 150 performs charge and discharge control at the next time.

On the other hand, if the mode control unit 152 determines that the regenerative power is smaller than or equal to the preset transmission peak-cut power (step S12: NO), the mode control unit 152 changes the control mode to the battery preferred mode (step S15). Here, if the control mode is already set to the battery preferred mode, there is no need to change the control mode.

When the control mode of the mode control unit 152 is set to the battery preferred mode, the charging rate monitoring unit 154 obtains the charging rate of the secondary battery 140. Then, the improving power value calculating unit 155 determines whether or not the charging rate of the secondary battery 140 is smaller than the target charging rate (step S16). If the charging rate of the secondary battery 140 is larger than or equal to the target charging rate (step S16: NO), charge of the secondary battery 140 is not performed and the processing returns to step S1, since the difference between the charging rate of the secondary battery 140 and the target charging rate becomes larger if the secondary battery 140 is charged.

On the other hand, if the charging rate of the secondary battery 140 is smaller than the target charging rate (step S16: YES), the improving power value calculating unit 155 calculates, by PI control, a charge improving power value based on the charging rate of the secondary battery 140 and the target charging rate (step S17). Then, the charging rate improving unit 156 determines whether or not a power value obtained by multiplying the regenerative power by the efficiency of the DC-DC converter 130 is smaller than or equal to the charge improving power value (step S18).

If the charging rate improving unit 156 determines that the power value obtained by multiplying the regenerative power by the efficiency of the DC-DC converter 130 is smaller than or equal to the charge improving power value (step S18: YES), the charging rate improving unit 156 outputs to the DC-DC converter 130, a charge instruction to have the secondary battery 140 charged at a power rate obtained by multiplying the regenerative power by the efficient (step S19). Thus, all the regenerative power generated by the load 120 is stored in the secondary battery 140. Consequently, the charging rate of the secondary battery 140 becomes closer to the target charging rate. Then, the processing returns to step S1, and the charge and discharge control device 150 performs charge and discharge control at the next time.

On the other hand, if the charging rate improving unit 156 determines that the power value obtained by multiplying the regenerative power by the efficiency of the DC-DC converter 130 is larger than the charge improving power value (step S18: YES), the charging rate improving unit 156 outputs to the DC-DC converter 130, a charge instruction to have the secondary battery 140 charged at a power rate equal to the charge improving power value (step S20). Thus, the charging rate of the secondary battery 140 becomes closer to the target charging rate. At this time, similar to step S19, if control is made to supply all the regenerative power generated by the load 120 to the secondary battery 140 for charging, the charging rate of the secondary battery 140 might exceed the target charging rate. For this reason, the secondary battery 140 is charged at the power rate equal to the charge improving power value, and the surplus power is collected by the wire 200, thereby making it possible to adequately control charge and discharge so that the charging rate of the secondary battery 140 becomes closer to the target charging rate.

Then, the processing returns to step S1, and the charge and discharge control device 150 performs charge and discharge control at the subsequent time.

The above processes from step S1 to step S20 are repeatedly performed, thereby making it possible to implement the peak-cut of the powers supplied from and corrected by the wire 200 and to perform a control so that the charging rate of the secondary battery 140 becomes closer to the target charging rate.

Next, charge and discharge control of the secondary battery 140 performed by the charge and discharge control device 150 of the present embodiment is described with reference to a specific example.

Figure 3:
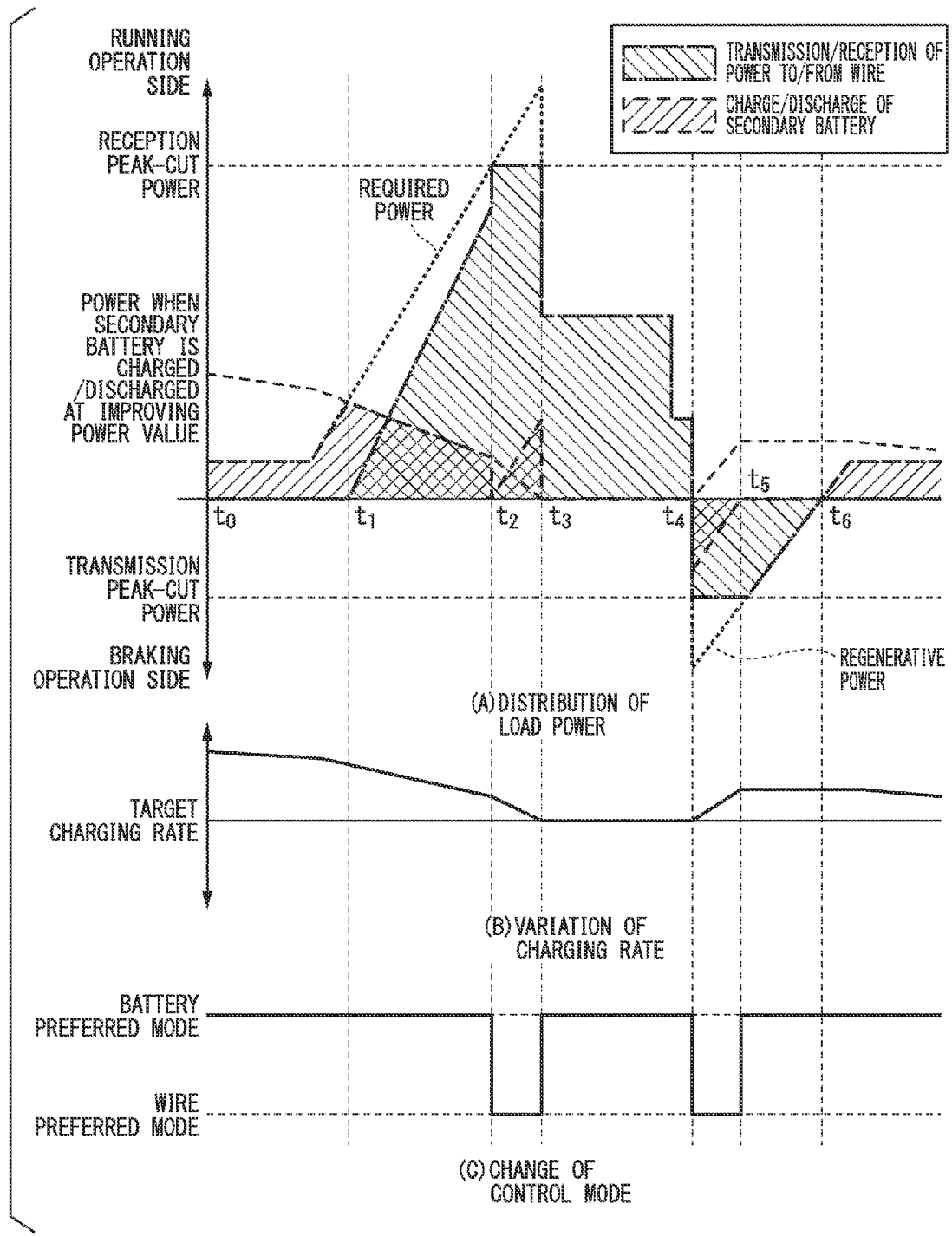
FIG. 3 is a diagram illustrating a specific example of a state at the time the charge and discharge control device of the first embodiment of the present invention performs charge and discharge control on a secondary battery.

FIG. 3 is a diagram illustrating a specific example of the state at the time the charge and discharge control device 150 of the first embodiment of the present invention performs charge and discharge control on the secondary battery 140.

First, at time $t_0$, the load power monitoring unit 151 obtains the load power and determines in step S2 that the load 120 is under the running operation. Then, the mode control unit 152 compares the required power of the load 120 and the reception peak-cut power, in step S3. At time $t_0$, the required power of the load 120 is smaller than the reception peak-cut power, as shown in FIG. 3(A). For this reason, in step S6, the mode control unit 152 changes the control mode to the battery preferred mode, as shown in FIG. 3(C).

Then, the improving power value calculating unit 155 determines whether or not the charging rate of the secondary battery 140 is larger than the target charging rate. At time $t_0$, the charging rate of the secondary battery 140 is larger than the target charging rate, as shown in FIG. 3(B). For this reason, in step S8, the improving power value calculating unit 155 calculates a discharge improving power value, as shown in FIG. 3(A).

Then, the charging rate improving unit 156 compares the discharge improving power value and a power value obtained by dividing the required power by the efficiency of the DC-DC converter 130, in step S9. At time $t_0$, the power value obtained by dividing the required power by the efficiency of the DC-DC converter 130 is smaller than or equal to the discharge improving power value, as shown in FIG. 3(A). For this reason, in step S10, the charging rate improving unit 156 outputs a discharge instruction to have the secondary battery 140 discharged at the power rate obtained by dividing the required power by the efficiency of the DC-DC converter 130.

Then, at time $t_1$, the power value obtained by dividing the required power by the efficiency of the DC-DC converter 130 exceeds the discharge improving power value, as shown in FIG. 3(A). For this reason, in step S11, the charging rate improving unit 156 outputs a discharge instruction to have the secondary battery 140 discharged at the power rate equal to the discharge improving power value. Then, the differential power between the required power and the power supplied from the secondary battery 140 is supplied from the wire 200 to the load 120, as shown in FIG. 3(A).

Then, at time $t_2$, the required power of the load 120 exceeds the reception peak-cut power, as shown in FIG. 3(A). For this reason, in step S4, the mode control unit 152 changes the control mode to the wire preferred mode. Then, the peak cutting unit 153 outputs a discharge instruction to have the second battery 140 discharged at a power rate obtained by dividing the difference between the required power and the reception peak-cut power by the efficiency of the DC-DC converter 130. At this time, the power supplied from the wire 200 becomes the reception peak-cut power.

Then, at time $t_3$, the required power of the load 120 becomes below the reception peak-cut power, as shown in FIG. 3(A). For this reason, in step S6, the mode control unit 152 changes the control mode to the battery preferred mode. Additionally, at time $t_3$, the charging rate of the secondary battery 140 reaches the target charging rate, as shown in FIG. 3(B). For this reason, in the process at the time $t_3$, the charge and discharge control device 150 does not output a discharge instruction to the DC-DC converter 130 in accordance with the result of the determination in step S7. For this reason, all the required power of the load 120 is supplied from the wire 200.

Then, at time $t_4$, the load 120 generates the regenerative power, as shown in FIG. 3(A). For this reason, in step S12, the mode control unit 152 compares the regenerative power of the load 120 and the transmission peak-cut power. At time $t_4$, the regenerative power of the load 120 becomes larger than or equal to the transmission peak-cut power, as shown in FIG. 3(A). For this reason, the mode control unit 152 changes the control mode to the wire preferred mode, in step S13, as shown in FIG. 3(C).

Then, the peak cutting unit 153 outputs a charge instruction to have the secondary battery 140 charged at a power rate obtained by the multiplying the difference between the regenerative power and the transmission peak-cut power by the efficiency of the DC-DC converter 130. At this time, the power collected by the wire 200 becomes the transmission peak-cut power. Additionally, by charging the secondary battery 140 at time $t_4$, the charging rate of the secondary battery 140 becomes larger than the target charging rate, as shown in FIG. 3(B).

Then, at time $t_5$, the regenerative power of the load 120 becomes below the transmission peak-cut power, as shown in FIG. 3(A). For this reason, in step S15, the mode control unit 152 changes the control mode to the battery preferred mode. Additionally, at time $t_5$, the charging rate of the secondary battery 140 is larger than the target charging rate, as shown in FIG. 3(B). For this reason, the charge and discharge control device 150 does not output a charge instruction to the DC-DC converter 130 in accordance with a result of the determination in step S16. For this reason, all the regenerative power of the load 120 is collected by the wire 200.

Then, at time $t_6$, the operation of the load 120 changes from the regenerative breaking operation to the running operation, as shown in FIG. 3(A). Additionally, at time $t_6$, the charging rate of the secondary battery 140 is larger than the target charging rate, as shown in FIG. 3(B). For this reason, in step S9, the improving power value calculating unit 156 compares the discharge improving power value and a power value obtained by dividing the required power by the efficiency of the DC-DC converter 130. At time $t_6$, the power value obtained by dividing the required power by the efficiency of the DC-DC converter 130 is smaller than or equal to the discharge improving power value, as shown in FIG. 3(A). For this reason, in step S10, the charging rate improving unit 156 outputs a discharge instruction to have the secondary battery 140 discharged at the power rate obtained by dividing the required power by the efficiency of the DC-DC converter 130. Thus, the charging rate of the secondary battery 140 becomes closer to the target charging rate, again.

As explained above, according to the present embodiment, the charge and discharge control device 150 has the secondary battery 140 discharged at a power rate that is larger than or equal to the difference between the required power and the reception peak-cut power when the required power of the load 120 is larger than or equal to the reception peak-cut power. When the required power of the load 120 is smaller than the reception peak-cut power, the discharge control device 150 has the secondary battery 140 discharged at a power rate that is smaller than or equal to the discharge improving power value.

Additionally, according to the present embodiment, the charge and discharge control device 150 has the secondary battery 140 charged at the power rate that is larger than or equal to the difference between the regenerative power and the transmission peak-cut power when the regenerative power of the load 120 is larger than or equal to the transmission peak-cut power. When the regenerative power of the load 120 is smaller than the transmission peak-cut power, the charge and discharge control device 150 has the secondary battery 140 charged at the power rate that is smaller than or equal to the charge improving power value.

Thus, it is possible to adjust the charging rate of the secondary battery 140 while cutting the peaks of the power transmitted to the wire 200 and the power received from the wire 200.

Descriptions have been given in the present embodiment with respect to the case where the peak cutting unit 153, in the wire preferred mode, control charge and discharge of the secondary battery 140 so that the power supplied from or collected by the wire 200 becomes the peak-cut power. However, the configuration is not limited thereto. In other words, as long as the power supplied from or collected by the wire 200 does not become larger than or equal to the peak-cut power, the peak cutting unit 153 may be configured to control charge and discharge of the secondary battery 140 so that the power received from or transmitted to the wire 200 becomes smaller than or equal to the peak-cut power.

Second Embodiment

Next, a second embodiment of the present invention is described here.

Figure 4:
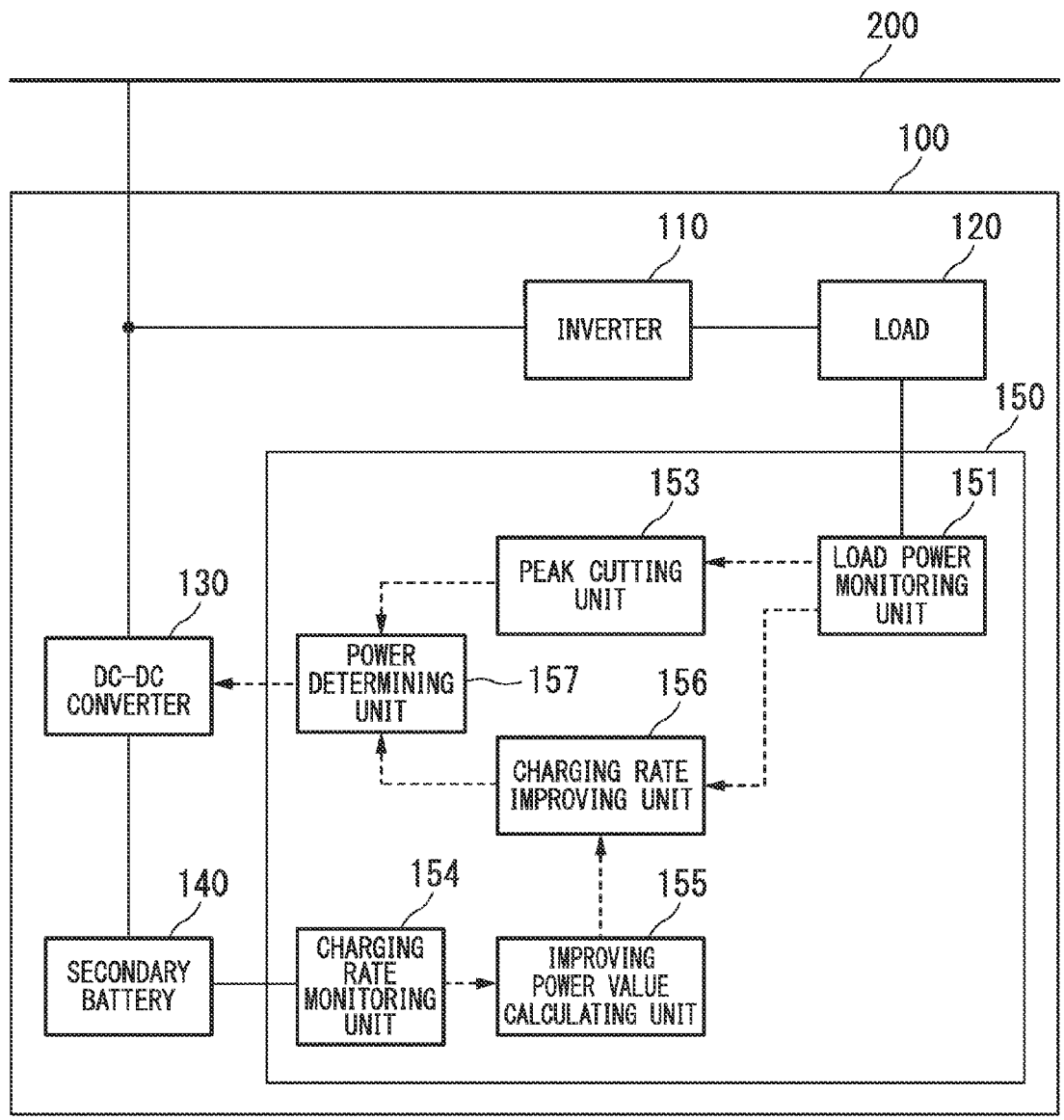
FIG. 4 is a schematic block diagram illustrating a configuration of the vehicle including the charge and discharge control device according to a second embodiment of the present invention.

FIG. 4 is a schematic block diagram illustrating a configuration of the vehicle 100 including the charge and discharge control device 150 according to a second embodiment of the present invention.

The charge and discharge control device 150 of the second embodiment does not include the mode control unit 152 included in the charge and discharge control device 150 of the first embodiment, but includes a power determining unit 157. The power determining unit 157 outputs to the DC-DC converter 130, an instruction to have the secondary battery 140 charged or discharged at a power rate that is larger of the powers to charge or discharge the secondary battery 140, which are output from the peak cutting unit 153 and the charging rate improving unit 156.

Next, processing of the charge and discharge control device 150 of the second embodiment is described here.

Figure 5:
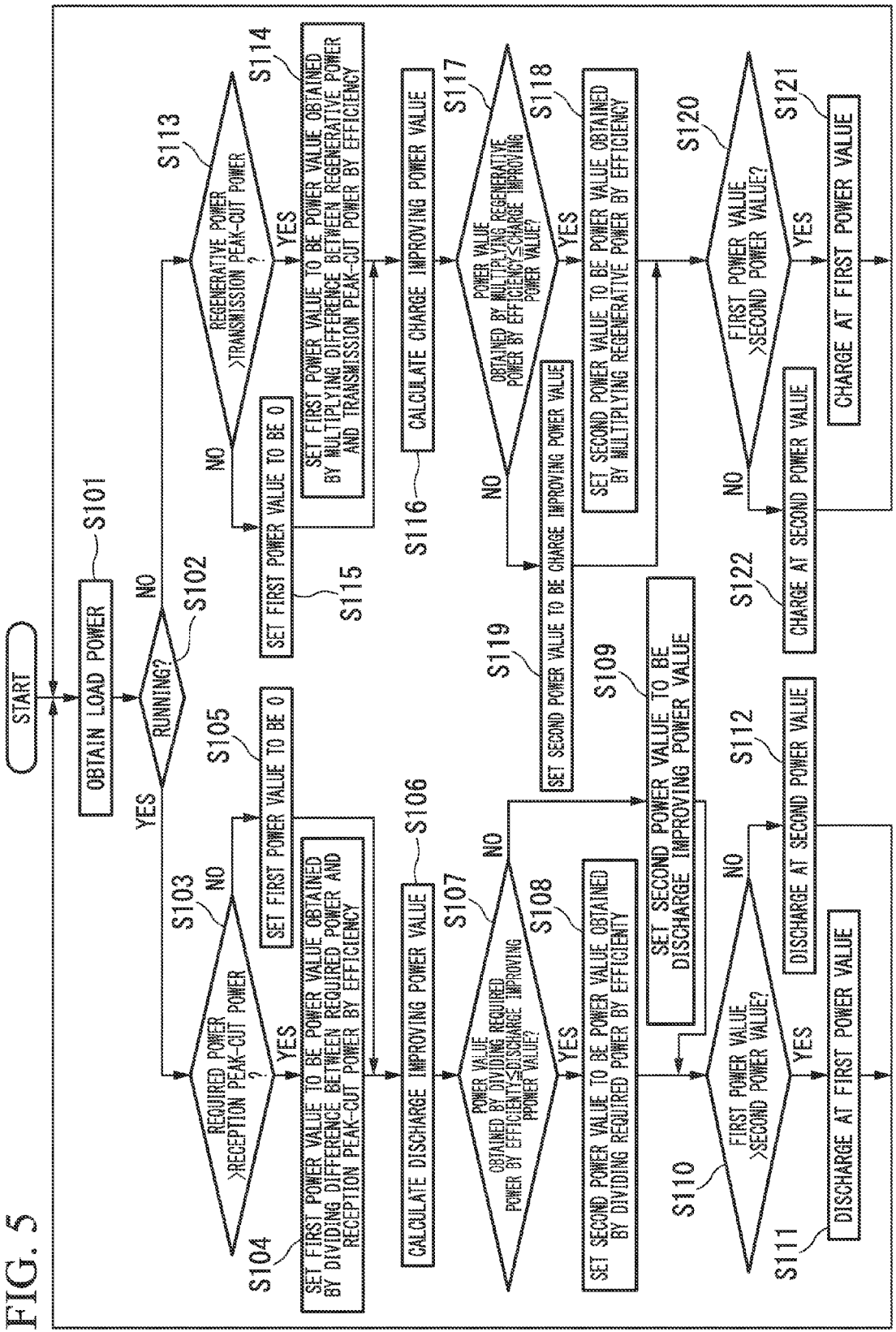
FIG. 5 is a flowchart illustrating processing of a charge and discharge control device according to a second embodiment of the present invention.

FIG. 5 is a flowchart illustrating the processing of the charge and discharge control device 150 according to the second embodiment of the present invention.

When a train initiates running, the load power monitoring unit 151 obtains the load power (step S101). Then, the load power monitoring unit 151 determines whether the load 120 is under a running operation or a braking operation (step S102).

If the load power monitoring unit 151 determines that the load 120 is under the running operation (step S102: YES), the peak cutting unit 153 determines whether or not the required power is larger than the preset reception peak-cut power (step S103). If the peak cutting unit 153 determines that the required power is larger than the preset reception peak-cut power (step S103: YES), the peak cutting unit 153 calculates, as a first power value, a power value obtained by dividing a value of the difference between the required power and the reception peak-cut power by the efficiency of the DC-DC converter 130 (step S104). On the other hand, if the peak cutting unit 153 determines that the required power is smaller than or equal to the preset reception peak-cut power (step S103: NO), the peak cutting unit 153 sets the first power value to be zero (step S105).

After the peak cutting unit 153 calculates the first power value in step S104 or step S105, the charging rate monitoring unit 154 obtains the charging rate of the secondary battery 140. Then, the improving power value calculating unit 155 calculates, by PI control, a discharge improving power value based on the charging rate of the secondary battery 140 and the target charging rate (step S106). Here, if the charging rate of the secondary battery 140 is smaller than the target charging rate, the discharge improving power value becomes zero. Then, the charging rate improving unit 156 determines whether or not the power value obtained by dividing the required power by the efficiency of the DC-DC converter 130 is smaller than or equal to the discharge improving power value (step S107).

If the charging rate improving unit 156 determines that the power value obtained by dividing the required power by the efficiency of the DC-DC converter 130 is smaller than or equal to the discharge improving power value (step S107:

YES), the charging rate improving unit 156 calculates, as a second power value, the power value obtained by dividing the required power by the efficiency (step S108). On the other hand, if the charging rate improving unit 156 determines that the power value obtained by dividing the required power by the efficiency of the DC-DC converter 130 is larger than the discharge improving power value (step S107: NO), the charging rate improving unit 156 sets the second power value to be the discharge improving power value (step S109).

After the charging rate improving unit 156 calculates the second power value in step S108 or S109, the power determining unit 157 determines whether or not the first power value calculated by the peak cutting unit 153 is larger than the second power value calculated by the charging rate improving unit 156 (step S110). If the power determining unit 157 determines that the first power value is larger than the second power value (step S110: YES), the power determining unit 157 outputs to the DC-DC converter 130, a discharge instruction to have the secondary battery 140 discharged at a power rate equal to the first power value (step S111). On the other hand, if the power determining unit 157 determines that the first power value is smaller than or equal to the second power value (step S110: NO), the power determining unit 157 outputs to the DC-DC converter 130, a discharge instruction to have the secondary battery 140 discharged at a power rate equal to the second power value (step S112).

Then, the processing returns to step S101 and the charge and discharge control device 150 performs charge and discharge control at the subsequent time.

On the other hand, in step S102, if the load power monitoring unit 151 determines that the load 120 is under the regenerative breaking operation (step S102: NO), the peak cutting unit 153 determines whether or not the regenerative power is larger than the preset transmission peak-cut power (step S113). If the peak cutting unit 153 determines that the regenerative power is larger than the preset transmission peak-cut power (step S113: YES), the peak cutting unit 153 calculates, as a first power value, a power value obtained by multiplying a value of the difference between the regenerative power and the transmission peak-cut power by the efficiency of the DC-DC converter 130 (step S114). On the other hand, if the peak cutting unit 153 determines that the regenerative power is smaller than or equal to the preset transmission peak-cut power (step S103: NO), the peak cutting unit 153 sets the first power value to be zero (step S115).

After the peak cutting unit 153 calculates the first power value in step S114 or step S115, the charging rate monitoring unit 154 obtains the charging rate of the secondary battery 140. Then, the improving power value calculating unit 155 calculates, by PI control, a charge improving power value based on the charging rate of the secondary battery 140 and the target charging rate (step S116). Here, when the charging rate of the secondary battery 140 is smaller than the target charging rate, the charge improving power value becomes zero. Then, the charging rate improving unit 156 determines whether or not the power value obtained by multiplying the regenerative power by the efficiency of the DC-DC converter 130 is smaller than or equal to the charge improving power value (step S117).

If the charging rate improving unit 156 determines that the power value obtained by multiplying the regenerative power by the efficiency of the DC-DC converter 130 is smaller than or equal to the charge improving power value (step S117: YES), the charging rate improving unit 156 calculates, as a second power value, the power value obtained by multiplying the regenerative power by the efficiency (step S118). On the other hand, if the charging rate improving unit 156 determines that the power value obtained by multiplying the regenerative power by the efficiency of the DC-DC converter 130 is larger than the charge improving power value (step S117: NO), the charging rate improving unit 156 sets the second power value to be the charge improving power value (step S119).

After the charging rate improving unit 156 calculates the second power value in step S118 or S119, the power determining unit 157 determines whether or not the first power value calculated by the peak cutting unit 153 is larger than the second power value calculated by the charging rate improving unit 156 (step S120). If the power determining unit 157 determines that the first power value is larger than the second power value (step S120: YES), the power determining unit 157 outputs to the DC-DC converter 130, a charge instruction to have the secondary battery 140 charged at the power rate equal to the first power value (step S121). On the other hand, if the power determining unit 157 determines that the first power value is smaller than or equal to the second power value (step S120: NO), the power determining unit 157 outputs to the DC-DC converter 130, a charge instruction to have the secondary battery 140 charged at the power rate equal to the second power value (step S122).

Then, the processing returns to step S101, and the charge and discharge control device 150 performs charge and discharge control at the subsequent time.

The above processes from step S101 to step S122 are repeatedly performed, thereby making it possible to implement the peak-cut of the powers supplied from and corrected by the wire 200 and to perform a control so that the charging rate of the secondary battery 140 becomes closer to the target charging rate. Particularly, according to the second embodiment, it is possible to perform a control so that the charging rate of the secondary battery 140 becomes closer to the target charging rate faster than in the first embodiment.

Next, charge and discharge control of the secondary battery 140 performed by the charge and discharge control device 150 according to the present embodiment is described with reference a specific example.

Figure 6:
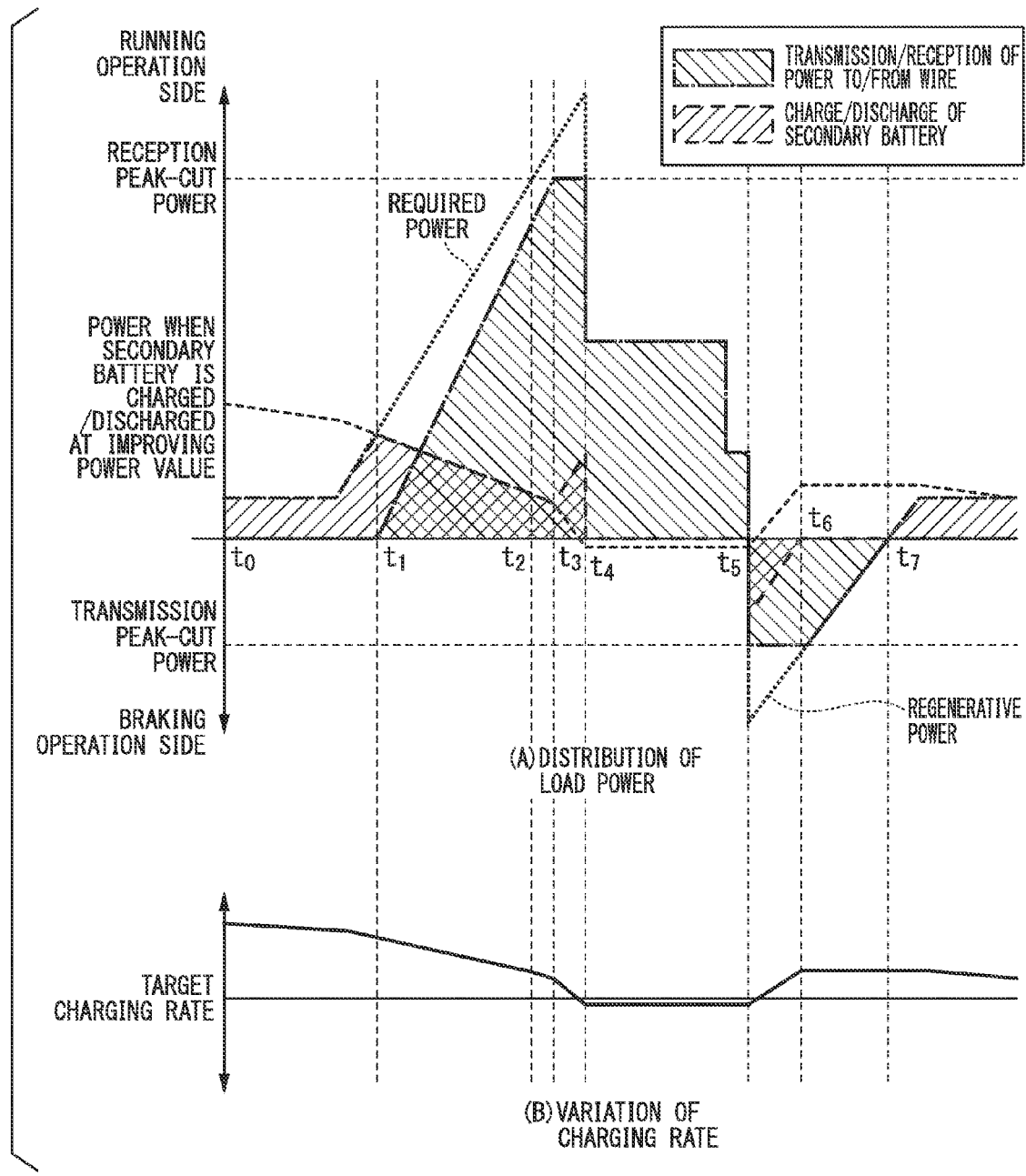
FIG. 6 is a diagram illustrating a specific example of a state at the time the charge and discharge control device of the second embodiment of the present invention performs charge and discharge control on a secondary battery.

FIG. 6 is a diagram illustrating a specific example of the state at the time the charge and discharge control device 150 of the second embodiment of the present invention performs charge and discharge control on the secondary battery 140.

First, at time $t_0$, the load power monitoring unit 151 obtains the load power and determines in step S102 that the load 120 is under the running operation. At this time, the required power of the load 120 is smaller than the reception peak-cut power as shown in FIG. 6(A). For this reason, in step S105, the peak cutting unit 153 sets the first power value to be zero. On the other hand, the power value obtained by dividing the required power by the efficiency of the DC-DC converter 130 is smaller than or equal to the discharge improving power value, as shown in FIG. 6(A). For this reason, in step S108, the charging rate improving unit 156 sets the second power value to be the power value obtained by dividing the required power by the efficiency of the DC-DC converter 130.

At this time, the first power value is smaller than or equal to the second power value. For this reason, the power determining unit 157 outputs a discharge instruction to have the secondary battery 140 discharged at the power rate equal to the second power value, that is, the power value obtained by dividing the required power by the efficiency of the DC-DC converter 130.

Then, at time $t_1$, the required power of the load 120 is smaller than the reception peak-cut power, as shown in FIG. 6(A). For this reason, in step S105, the peak cutting unit 153 sets the first power value to be zero. On the other hand, the power value obtained by dividing the required power by the efficiency of the DC-DC converter 130 is larger than the discharge improving power value, as shown in FIG. 6(A). For this reason, in step S109, the charging rate improving unit 156 sets the second power value to be the discharge improving power value.

At this time, the first power value is smaller than or equal to the second power value. For this reason, the power determining unit 157 outputs a discharge instruction to have the secondary battery 140 discharged at the power rate equal to the second power value, that is, the discharge improving power. Then, the differential power between the required power and the power supplied from the secondary battery 140 is supplied from the wire 200 to the load 120, as shown in FIG. 6(A).

Then, at time $t_2$, the required power of the load 120 exceeds the reception peak-cut power, as shown in FIG. 6(A). For this reason, in step S104, the peak cutting unit 153 sets the first power value to be the power value obtained by dividing a value of the difference between the required power and the reception peak-cut power by the efficiency of the DC-DC converter 130. On the other hand, the power value obtained by dividing the required power by the efficiency of the DC-DC converter 130 is larger than the discharge improving power value, as shown in FIG. 6(A). For this reason, in step S109, the charging rate improving unit 156 sets the second power value to be the discharge improving power value.

At this time, the first power value is smaller than or equal to the second power value. For this reason, the power determining unit 157 outputs a discharge instruction to have the secondary battery 140 discharged at the power rate equal to the second power value, that is, the discharge improving power value. In other words, according to the present embodiment, even when the required power is larger than or equal to the reception peak-cut power, as long as the discharge improving power value is larger than or equal to the differential power between the required power and the reception peak-cut power, the secondary battery 140 is discharged at the power rate equal to the discharge improving power value.

On the other hand, at time t3, the first power value becomes larger than the second power value. For this reason, the power determining unit 157 outputs a discharge instruction to have the secondary battery 140 discharged at the power rate equal to the first power value, that is, the value of the difference between the required power and the reception peak-cut power. At this time, the power supplied from the wire 200 becomes the reception peak-cut power.

Then, at time $t_4$, the required power of the load 120 becomes below the reception peak-cut power, as shown in FIG. 6(A). For this reason, in step S105, the peak cutting unit 153 sets the first power value to be zero. On the other hand, at time $t_4$, the charging rate of the secondary battery 140 is below the target charging rate, as shown in FIG. 6(B). For this reason, the discharge improving power value is zero. Accordingly, the power value obtained by dividing the required power by the efficiency of the DC-DC converter 130 is larger than the discharge improving power value. For this reason, in step S109, the charging rate improving unit 156 sets the second power value to be the discharge improving power value. In other words, the second power value becomes zero.

Accordingly, the first and second power values are zero. For this reason, the power determining unit 157 outputs a discharge instruction to have the secondary battery 140 discharged at the power rate equal to zero. This is equivalent to that the discharge instruction is not output. For this reason, all the required power of the load 120 is supplied from the wire 200.

Then, at time $t_5$, the load power monitoring unit 151 obtains the load power and determines in step S102 that the load 120 is under the regenerative breaking operation. At this time, the regenerative power of the load 120 is larger than or equal to the transmission peak-cut power, as shown in FIG. 6(A). For this reason, in step S114, the peak cutting unit 153 sets the first power value to be a power value obtained by multiplying a value of the difference between the regenerative power and the transmission peak-cut power by the efficiency of the DC-DC converter 130. On the other hand, the power value obtained by multiplying the regenerative power by the efficiency of the DC-DC converter 130 is larger than the charge improving power value. For this reason, in step S119, the charging rate improving unit 156 sets the second power value to be the charge improving power value.

At this time, the first power value is larger than the second power value. For this reason, the power determining unit 157 outputs a charge instruction to have the secondary battery 140 charged at the power rate equal to the first power value, that is, the power value obtained by multiplying the value of the difference between the regenerative power and the transmission peak-cut power by the efficiency of the DC-DC converter 130.

Then, at time $t_6$, the regenerative power of the load 120 is larger than or equal to the transmission peak-cut power, as shown in FIG. 6(A). For this reason, in step S115, the peak cutting unit 153 sets the first power value to be zero. On the other hand, at time $t_6$, the charging rate of the secondary battery 140 is above the target charging rate, as shown in FIG. 6(B). For this reason, the charge improving power value is zero. Accordingly, the power value obtained by multiplying the regenerative power by the efficiency of the DC-DC converter 130 is larger than the charge improving power value. For this reason, in step S119, the charging rate improving unit 156 sets the second power value to be the charge improving power value. In other words, the second power value becomes zero.

Accordingly, the first and second power values are zero. For this reason, the power determining unit 157 outputs a charge instruction to have the secondary battery 140 charged at the power rate equal to zero. This is equivalent to that the charge instruction is not output. For this reason, all the regenerative power of the load 120 is collected by the wire 200.

Then, at time $t_7$, the operation of the load 120 changes from the regenerative braking operation to the running operation, as shown in FIG. 6(A). Additionally, the required power of the load 120 is smaller than the reception peak-cut power, as shown in FIG. 6(A). For this reason, in step S105, the peak cutting unit 153 sets the first power value to be zero. On the other hand, the power value obtained by dividing the required power by the efficiency of the DC-DC converter 130 is smaller than or equal to the discharge improving power, as shown in FIG. 6(A). For this reason, in step S108, the charging rate improving unit 156 sets the second power value to be the power value obtained by dividing the required power by the efficiency of the DC-DC converter 130.

At this time, the first power value is smaller than or equal to the second power value. For this reason, the power determining unit 157 outputs a discharge instruction to have the secondary battery 140 discharged at the power rate equal to the second power value, that is, the power value obtained by dividing the required power by the efficiency of the DC-DC converter 130. Thus, the charging rate of the secondary battery 140 becomes closer to the target charging rate, again.

As explained above, according to the present embodiment, the charge and discharge control device 150 has the secondary battery 140 discharged at the power rate equal to the discharge improving power value when the required power is larger than or equal to the reception peak-cut power, and the discharge improving power is larger than or equal to the value of the difference between the required power and the reception peak-cut power.

Additionally, according to the present embodiment, the charge and discharge control device 150 has the secondary battery 140 charged at the power rate equal to the discharge improving power value when the regenerative power is larger than or equal to the transmission peak-cut power, and the charge improving power is larger than or equal to the value of the difference between the regenerative power and the transmission peak-cut power.

Thus, it is possible to adjust the charging rate of the secondary battery 140 more efficiently than in the first embodiment while cutting the peaks of the power transmitted to the wire 200 and the power received from the wire 200. Additionally, determination of the control mode is not performed, thereby making the control logic simpler than that in the first embodiment. Further, it is possible in the second embodiment to prevent a rapid variation of the power of the secondary battery, compared to the second embodiment, thereby enabling a reduction in load on devices, such as the DC-DC converter 130 and the inverter 110.

Different from the first embodiment, descriptions have been given in the present embodiment with respect to the case where determination of the control mode is not performed. However, the configuration is not limited thereto. For example, the peak cutting unit 153 may be configured to, when the control mode is set to the wire preferred mode, if the discharge improving power value is larger than or equal to the power obtained by dividing the difference between the required power and the reception peak-cut power by the efficiency of the DC-DC converter 130, output an instruction to have the secondary battery 140 discharged at the power rate equal to the discharge improving power value, thereby achieving the same effect as that of the first embodiment. Similarly, the peak cutting unit 153 may be configured to, when the control mode is set to the wire preferred mode, if the charge improving power value is larger than or equal to the power obtained by multiplying the difference between the required power and the reception peak-cut power by the efficiency of the DC-DC converter 130, output an instruction to have the secondary battery 140 charged at the power rate equal to the charge improving power value, thereby achieving the same effect as that of the first embodiment.

Third Embodiment

Next, processing of the charge and discharge control device 150 according to a third embodiment of the present invention is described here.

The charge and discharge control device 150 of the third embodiment is configured to perform a control such that the peak cutting unit 153 of the charge and discharge control device 150 of the first or second embodiment outputs a control instruction to have the secondary battery 140 charged or discharged within a use voltage range or a use current range of the secondary battery 140. In other words, control is made such that the peak cutting unit 153 outputs a discharge control instruction to have the secondary battery 140 discharged at a power rate that is smaller than the maximum discharge power value allowable by the second battery 140, and outputs a charge control instruction to have the secondary battery 140 charged at a power rate that is smaller than the maximum charge power value allowable by the second battery 140.

Specifically, at the time the capacity of the secondary battery 140 is designed, a configuration is made such that the power to be calculated by the peak cutting unit 153 in step S5 or S104 becomes smaller than a power value obtained by multiplying a value of the monitored voltage of the secondary battery 140 by the amount of the maximum allowable discharge current. At this time, as the maximum allowable discharge current, a current value obtained by dividing by an internal resistance of the secondary battery 140, a value obtained by subtracting the minimum allowable voltage of the secondary battery 140 from the voltage of an open circuit of the secondary battery 140, may be used.

Additionally, at the time the capacity of the secondary battery 140 is designed, a configuration is made such that the power to be calculated by the peak cutting unit 153 in step S14 or S114 is smaller than a power value obtained by multiplying a value of the monitored voltage of the secondary battery 140 by the amount of the minimum allowable discharge current. At this time, as the minimum allowable discharge current, a current value obtained by dividing by the internal resistance of the secondary battery 140, a value obtained by subtracting the maximum allowable voltage of the secondary battery 140 from the voltage of the open circuit of the secondary battery 140, may be used.

Thus, the charge and discharge control device 150 can control charge and discharge of the secondary battery 140 within the use range of the secondary battery 140. Here, when the use range is exceeded while the vehicle 100 is running, a margin is previously provided for a power supplying device (not shown) that supplies the power to the wire 200, or acceleration or deceleration of the vehicle 100 is adjusted, thereby preventing the use range from being exceeded.

Fourth Embodiment

Next, a fourth embodiment of the present invention is described here.

Figure 7:
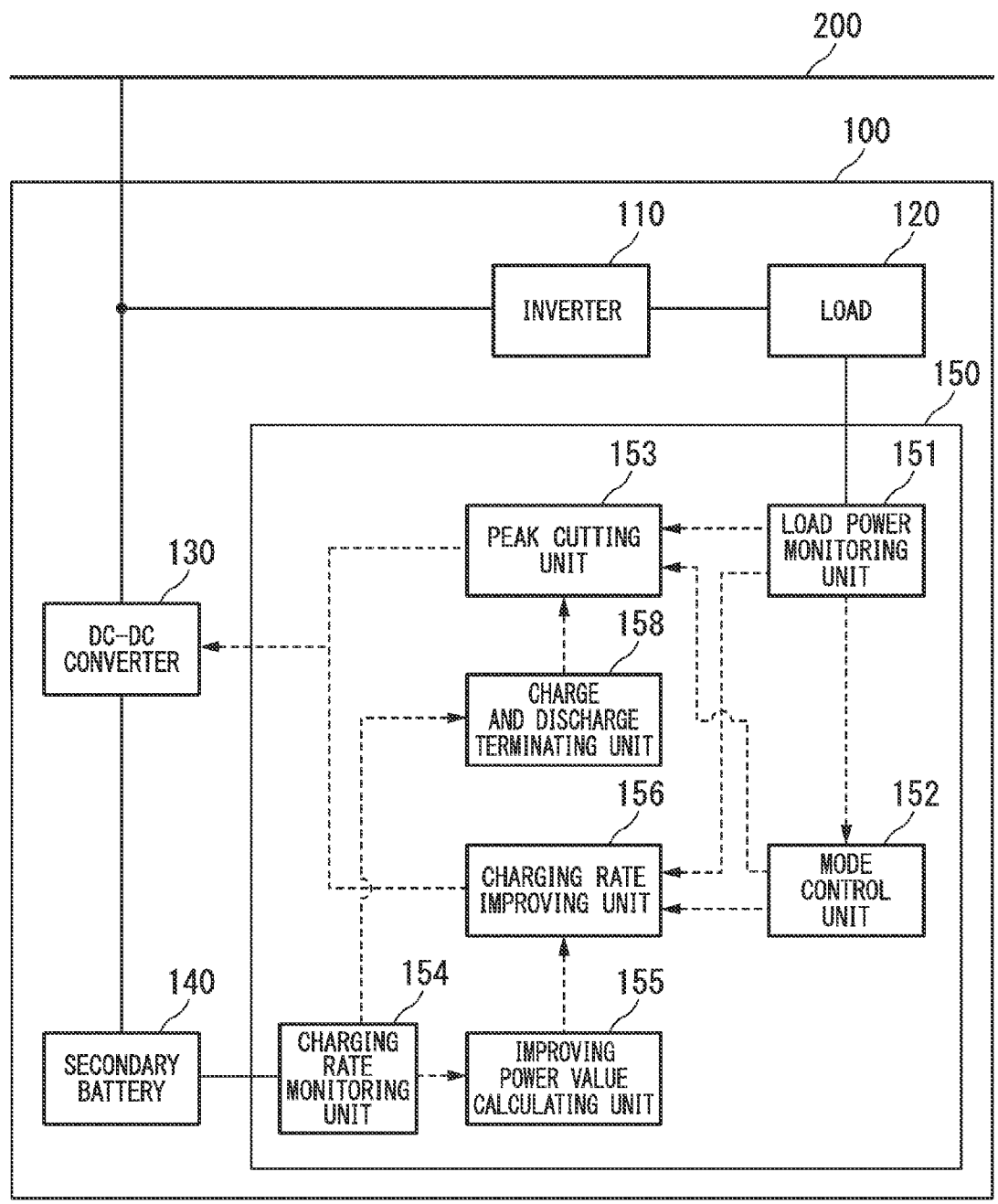
FIG. 7 is a schematic block diagram illustrating a configuration of a vehicle including a charge and discharge control device according to a fourth embodiment of the present invention.

FIG. 7 is a schematic block diagram illustrating a configuration of the vehicle 100 including the charge and discharge control device 150 according to the fourth embodiment of the present invention.

The charge and discharge control device 150 of the fourth embodiment is configured to further include a charge and discharge terminating unit 158 (a charge terminating unit, a discharge terminating unit) in the charge and discharge control device 150 of the first embodiment. The charge and discharge terminating unit 158 terminates discharge by the peak cutting unit 153 when the charging rate of the secondary battery 140 is smaller than the minimum charging rate allowable to the secondary battery 140. Additionally, the charge and discharge terminating unit 158 terminates charge by the peak cutting unit 153 when the charging rate of the secondary battery 140 exceeds the maximum charging rate allowable to the secondary battery 140.

Thus, the charge and discharge control device 150 can control charge and discharge of the secondary battery 140 within the use range of the secondary battery 140. Here, when the use range is exceeded while the vehicle 100 is running, a margin is previously provided for a power supplying device (not shown) that supplies the power to the wire 200, or acceleration or deceleration of the vehicle 100 is adjusted, thereby preventing the use range from being exceeded.

Here, the charging rate improving unit 156 does not output a charge instruction when the charging rate of the secondary battery 140 is larger than the target charging rate. Additionally, the charging rate improving unit 156 does not output a discharge instruction when the charging rate of the secondary battery 140 is smaller than the target charging rate. For this reason, it is sufficient for the charge and discharge terminating unit 158 to stop the peak cutting unit 153 to output the charge or discharge instruction.

Some embodiments of the present invention have been described above with reference to the drawings. However, the specific configuration is not limited to the above, and various design modifications may be made without departing from the scope of the present invention.

For example, descriptions have been given in the above embodiments with respect to the case where control is performed with respect to both the charge processing and the discharge processing. However, the configuration is not limited thereto. In other words, a configuration may be such that the charge control method of the present invention is used only at the time the secondary battery 140 is charged, and another control method is used at the time the secondary battery 140 is discharged. Alternatively, a configuration may be such that the discharge control method of the present invention is used only at the time the secondary battery 140 is discharged, and another control method is used at the time the secondary battery 140 is charged.

The above charge and discharge control device 150 includes a computer system. A program for implementing the above process of each processing unit is stored in a computer-readable recording medium, so that a computer reads and executes the program to perform the above process. Here, the "computer-readable recording medium" includes a magnet disk, a magneto optical disk, a CD-ROM, a DVD-ROM, a semiconductor memory, and the like. Additionally, the computer program may be distributed to computers via communication lines, so that a computer receiving the distribution can execute the program.

Further, the program includes a program that executes part of the aforementioned functions. Moreover, the program includes a program, called a differential file (differential program), which can implement the aforementioned functions in combination with the program already stored in the computer system.

INDUSTRIAL APPLICABILITY

The present invention is applicable to wire-less vehicles mounted with secondary batteries.

DESCRIPTION OF REFERENCE NUMERALS

100: vehicle
110: inverter
120: load
130: DC-DC converter
140: secondary battery
150: charge and discharge control device
151: load power monitoring unit
152: mode control unit
153: peak cutting unit
154: charging rate monitoring unit
155: improving power value calculating unit
156: charging rate improving unit
157: power determining unit
158: charge and discharge terminating unit
200: wire

The invention claimed is:

1. A charge and discharge control device configured to control charge and discharge of a secondary battery coupled to a load capable of generating a regenerative power, the charge and discharge control device comprising:

a peak cutting unit configured to, in a case that a required power required by the load is larger than or equal to a reception peak-cut power set as a power receivable from a wire, have the secondary battery discharged at a power rate that is larger or equal to a difference between the required power and the reception peak-cut power;

an improving power value calculating unit configured to calculate a discharge improving power value defined as a power value that increases as a charging rate of the secondary battery becomes larger than a target charging rate; and a charging rate improving unit configured to, in a case that the required power is smaller than or equal to the reception peak-cut power, have the secondary battery discharged at a power rate that is smaller than or equal to the discharge improving power value calculated by the improving power value calculating unit.

2. The charge and discharge control device according to claim 1, wherein the peak cutting unit is configured to have the secondary battery discharged at a power rate equal to the discharge improving power value, in a case that the required power is larger than or equal to the reception peak-cut power, and the discharge improving power value is larger than or equal to a value of a difference between the required power and the reception peak-cut power.

3. The charge and discharge control device according to claim 1, wherein the peak cutting unit is configured to have the secondary battery discharged at a power rate that is smaller than a maximum discharge power value for discharge allowed by the secondary battery.

4. The charge and discharge control device according to claim 1, further comprising:

a discharge terminating unit configured to terminate discharge by the peak cutting unit in a case that the charging rate of the secondary battery is smaller than a minimum charging rate allowed to the secondary battery.

5. The charge and discharge control device according to claim 1, wherein the peak cutting unit is configured to, in a case that a regenerative power generated by the load is larger than or equal to a transmission peak-cut power set as a power transmittable to a wire, have the secondary battery charged at a power rate that is larger than or equal to a difference between the regenerative power and the transmission peak-cut power, the improving power value calculating unit is configured to calculate a charge improving power value defined as a power value that increases as the charging rate of the secondary battery becomes lower than the target charging rate of the secondary battery, and the charging rate improving unit is configured to, in a case that the regenerative power is smaller than or transmission peak-cut power, have the secondary battery charged at a power rate that is smaller than or equal to the charge improving power value calculated by the improving power value calculating unit.

6. The charge and discharge control device according to claim 5, wherein the peak cutting unit is configured to have the secondary battery charged at a power rate equal to the charge improving power value, in a case that the regenerative power is larger than or equal to the transmission peak-cut power, and the charge improving power value is larger than or equal to a difference between the regenerative power and the transmission peak-cut power.

7. The charge and discharge control device according to claim 5, wherein the peak cutting unit is configured to have the secondary battery charged at a power rate that is smaller than a maximum charge power value for charge allowed by the secondary battery.

8. The charge and discharge control device according to claim 5, further comprising:
a charge terminating unit configured to terminate charge by the peak cutting unit in a case that the charging rate of the secondary battery exceeds a maximum charging rate allowed to the secondary battery.

9. A charge and discharge control device configured to control charge and discharge of a secondary battery coupled to a load capable of generating a regenerative power, the charge and discharge control device comprising:
a peak cutting unit configured to, in a case that a regenerative power generated by the load is larger than or equal to a transmission peak-cut power set as a power transmittable to a wire, have the secondary battery charged at a power rate that is larger or equal to a difference between the regenerative power and the transmission peak-cut power;
an improving power value calculating unit configured to calculate a charge improving power value defined as a power value that increases as a charging rate of the secondary battery becomes smaller than a target charging rate; and
a charging rate improving unit configured to, in a case that the regenerative power is smaller than or equal to the transmission peak-cut power, have the secondary battery charged at a power rate that is smaller than or equal to the charge improving power value calculated by the improving power value calculating unit.

10. The charge and discharge control device according to claim 9, wherein the peak cutting unit is configured to have the secondary battery charged at a power rate equal to the charge improving power value, in a case that the regenerative power is larger than or equal to the transmission peak-cut power, and the charge improving power value is larger than or equal to a value of a difference between the regenerative power and the transmission peak-cut power.

11. A charge and discharge control method using a charge and discharge control device configured to control charge and discharge of a secondary battery coupled to a load capable of generating a regenerative power, the charge and discharge control method comprising:
comparing a power required by the load with a reception peak-cut power set as a power receivable from a wire:
in a case that the required power is larger than or equal to the reception peak-cut power, discharging, by a peak cutting unit, the secondary battery at a power rate that is larger than or equal to a difference between the required power and the reception peak-cut power;
calculating, by an improving power value calculating unit, a discharge improving power value defined as a power value that increases as a charging rate of the secondary battery becomes larger than a target charging rate; and
in a case that the required power is smaller than or equal to the reception peak-cut power, discharging, by a charging rate improving unit, the secondary battery at a power rate that is smaller than or equal to the discharge improving power value calculated by the improving power value calculating unit.

12. A charge and discharge control method using a charge and discharge control device configured to control charge and discharge of a secondary battery coupled to a load capable of generating a regenerative power, the charge and discharge control device comprising:
comparing a regenerative power required by the load with a transmission peak-cut power set as a power transmittable to a wire;
in a case that the regenerative power is larger than or equal to the transmission peak-cut power, charging, by a peak cutting unit, the secondary battery at a power rate that is larger than or equal to a difference between the regenerative power and the transmission peak-cut power;
calculating, an improving power value calculating unit, a charge improving power value defined as a power value that increases as a charging rate of the secondary battery becomes smaller than a target charging rate; and
in a case that the regenerative power is smaller than or equal to the transmission peak-cut power, charging, by a charging rate improving unit, the secondary battery charged at a power rate that is smaller than or equal to the charge improving power value calculated by the improving power value calculating unit.

13. A non-transitory computer readable medium having embedded thereon a program, which when executed by a processor, causes the processor to configure a charge and discharge control device configured to control charge and discharge of a secondary battery coupled to a load capable of generating a regenerative power, the charge and discharge control device comprising:
a peak cutting unit configured to, in a case that a required power required by the load is larger than or equal to a reception peak-cut power set as a power receivable from a wire, have the secondary battery discharged at a power rate that is larger or equal to a difference between the required power and the reception peak-cut power;
an improving power value calculating unit configured to calculate a discharge improving power value defined as a power value that increases as a charging rate of the secondary battery becomes larger than a target charging rate; and
a charging rate improving unit configured to, in a case that the required power is smaller than or equal to the reception peak-cut power, have the secondary battery discharged at a power rate that is smaller than or equal to the discharge improving power value calculated by the improving power value calculating unit.

14. A non-transitory computer readable medium having embedded thereon a program, which when executed by a processor, causes the processor to configure a charge and discharge control device configured to control charge and discharge of a secondary battery coupled to a load capable of generating a regenerative power, the charge and discharge control device comprising:
a peak cutting unit configured to, in a case that a regenerative power generated by the load is larger than or equal to a transmission peak-cut power set as a power transmittable to a wire, have the secondary battery charged at a power rate that is larger or equal to a difference between the regenerative power and the transmission peak-cut power;
an improving power value calculating unit configured to calculate a charge improving power value defined as a power value that increases as a charging rate of the secondary battery becomes smaller than a target charging rate; and
a charging rate improving unit configured to, in a case that the regenerative power is smaller than or equal to the transmission peak-cut power, have the secondary battery charged at a power rate that is smaller than or equal to the charge improving power value calculated by the improving power value calculating unit.

* * * * *